United States Patent [19]
Garrett

[11] 4,057,281
[45] Nov. 8, 1977

[54] CARRYING RACK FOR TRUCKS

[76] Inventor: Luther J. Garrett, 8345 S. 84th Court, Hickory Hills, Ill. 60457

[21] Appl. No.: 674,374

[22] Filed: Apr. 7, 1976

[51] Int. Cl.$^2$ .............................................. B60D 3/00
[52] U.S. Cl. ..................................... 296/3; 224/29 R
[58] Field of Search ................... 296/3, 10; 224/29 R, 224/42.1 R, 42.1 E; 214/450

[56] References Cited
U.S. PATENT DOCUMENTS

| | | | |
|---|---|---|---|
| 2,947,566 | 8/1960 | Tower | 296/3 |
| 3,224,805 | 12/1965 | Clyatt | 296/29 |
| 3,589,576 | 6/1971 | Rinkle | 296/3 |
| 3,765,713 | 10/1973 | Suitt | 224/29 R |
| 3,892,262 | 6/1975 | Brunel | 296/3 |

*Primary Examiner*—Joseph F. Peters, Jr.
*Assistant Examiner*—John A. Carroll

[57] ABSTRACT

A quickly detachable and easily foldable carrying rack to facilitate carrying elongated and bulky articles on the horizontally disposed rectangular framework of the rack above the bed and cab of the truck. Support pads for supporting each leg of the rack include a base plate rigidly and permanently attached to the bed of the truck and a post projecting upwardly from the base plate with a bore therethrough for connection to a lower end of each leg of the rack. Bracket members pivotally connect the legs, at the other end thereof, to the rectangular framework, permitting the legs to be folded against the framework for efficient storage when the rack is removed from the support pads. An additional crossbar overlies the central area of the bed for further load support, is detachable for an unimpeded area above the bed of the truck, and has tabs extending beyond the ends thereof for cooperation with said framework to prevent twisting of the additional crossbar.

7 Claims, 6 Drawing Figures

CARRYING RACK FOR TRUCKS

BACKGROUND OF THE INVENTION

This invention relates in general to a carrying rack for a truck for supporting elongated or large loads over the bed and cab of the truck, and more particularly to a carrying rack which is detachably secured to the bed of the truck for quick and easy installation and removal and with foldable support legs permitting efficient storage during periods of nonuse.

Various types of carrying racks are known in the prior art. Such racks are usually mounted on side walls of a pick-up truck or in stake sockets generally provided in the side walls near the corners of the box or bed of the truck. Because the side walls of a pick-up truck are usually fabricated from a relatively light gauge of sheet metal, prior art racks are not suitable for heavy loads, or the racks employ elongated feet or bases to distribute the load along the side walls of the truck.

Prior art racks are also time consuming to install or remove, and do not permit efficient storage thereof. Even where these racks are designed to be stored in planar sections, inefficient disassembly operations result in any storage features being of little usable or practical value.

SUMMARY OF THE INVENTION

The carrying rack of the present invention is supported directly by the bed of the truck. Separate support pads, one for each leg of the rack, are rigidly and permanently mounted to the bed of the truck. The pads are small and located near the periphery of the bed of the truck. Such support means also permit unobstructed entry into the bed from the sides of the truck to aid in loading bulky materials even when the rack is attached to the support means.

A further novel feature of the invention is the pivoted connection of the legs of the rack to the framework thereof. This enables the legs to be folded agaist the framework when the rack is detached from the support pads and when certain bracing is loosened, thereby providing a generally planar rack for efficient storage. Securing hardware which is quickly detachable is preferred in securing the legs to the support pads.

A detachable crossbar intermediate the rearward and forward pairs of legs and mounted to the framework of rack provides additional support for flexible loads or smaller material. When removed, the intermediate crossbar provides a generally unimpeded area above the bed of the truck.

Various other objects, features and advantages of the invention will become apparent from the following detailed disclosure when taken in conjunction with the drawings.

BRIEF DESCRIPTION OF THE DRAWINGS

In the drawings:

FIG. 3 is a side view of the rack illustrating the rack removed from the truck and with the legs folded against the framework;

DESCRIPTION OF THE PREFERRED EMBODIMENTS

Figure 1:
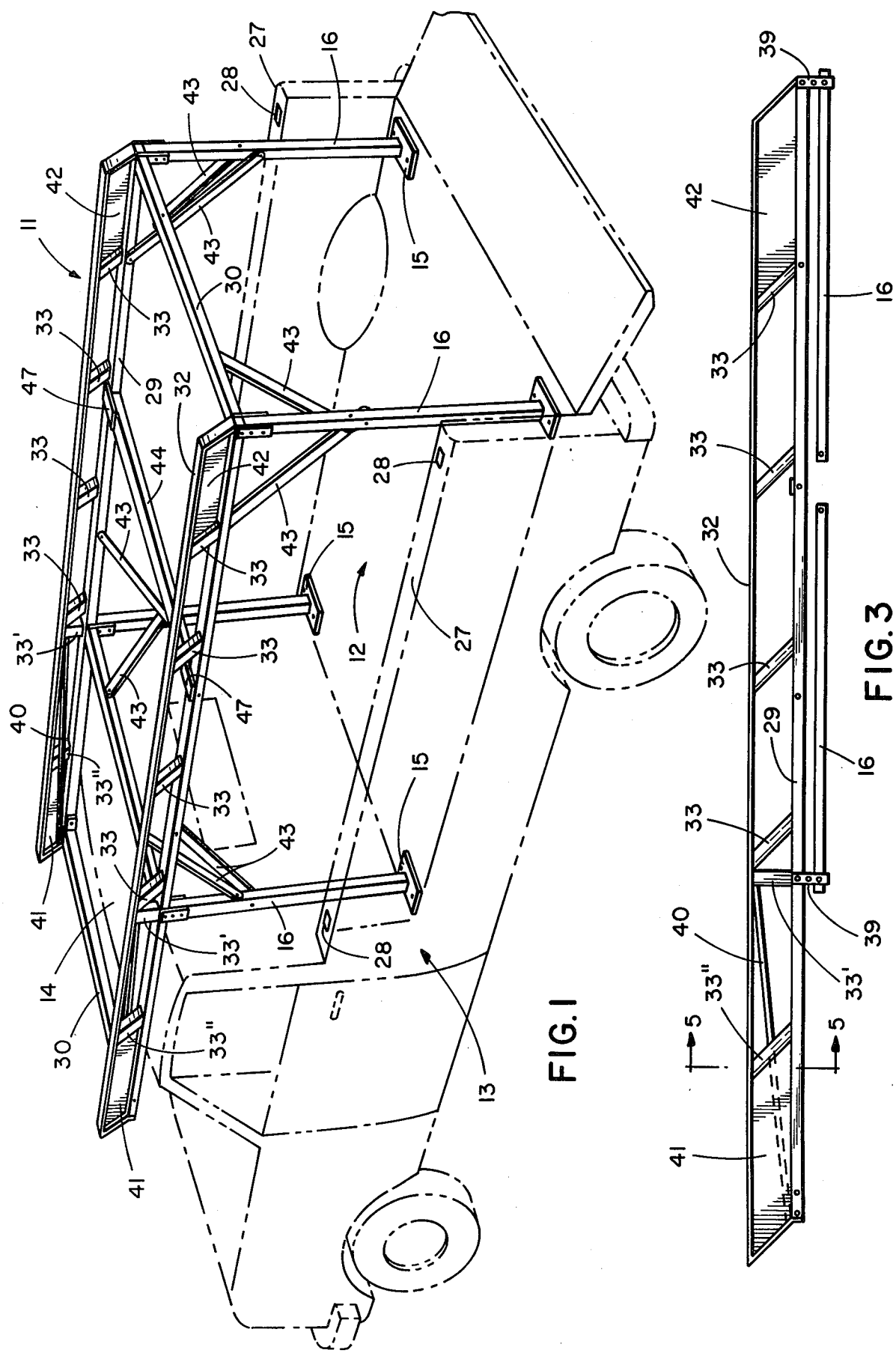
FIG. 1 is a perspective view of the carrying rack according to the present invention and shown attached to the bed of a truck, where the truck is shown in broken lines.

Turning to FIG. 1, a carrying rack 11 is shown mounted to a bed 12 of a pick-up truck 13. The rack 11 generally extends above and overlies a cab portion 14 of the truck 13, as well as above the bed 12. As is known in the art, such racks facilitate carrying of lengthy articles or material such as pipes, ladders, sheets of building material and the like. The rack 11 augments the limited length of the bed 12 of the truck 13.

Unlike prior art racks, the rack 11 of the present invention is mounted directly to the bed 12 of the truck 13. A plurality of support pads 15, one for each leg 16 of the rack 11, are mounted to the bed 12 of the truck 13 in a rigid and permanent manner. Because the size of the pads 15 is relatively small and the pads 15 are mounted near the periphery of the bed 12, the pads 15 will rarely interfere with normal usage of the truck 13.

Figure 2:
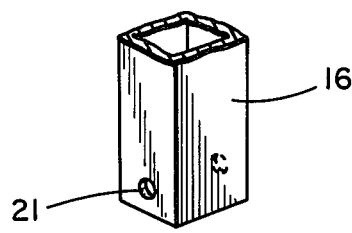
FIG. 2 is an exploded fragmentary perspective view of one of the connections of the mounting pad to the leg of the rack.

As illustrated in FIG. 2, the support pads 15 typically have a base plate 17. Fastening means (not shown), such as bolts, screws or the like, secure the pad 15 to the bed 12 of the truck 13 through the slots 18. A short post 19 is rigidly attached near the center of the plate 17, as by welding or other rigid attachment means. A bore 20 passes through the post 19 generally parallel to the plane of the plate 17.

The leg 16 of the rack 11 is fabricated from hollow tubular stock with its inside dimensions slightly larger than the dimensions of the post 19. The post 19 fits into the hollow interior of the leg 16 such that the bottom edge of the leg 16 rest upon the plate 17 of the support pad 15. Apertures 21 in the leg 16 are then in axial alignment with the bore 20 in the post 19.

The means for detachably securing the legs 16 to the support pads 15 preferably comprise quick connect-disconnect type connectors to best utilize the invention to its full advantages. A typical connector is a pin 22 with an enlarged head portion 23 at one end of the pin 22 and a diametric hole 24 near the other end thereof. The pin 22 passes through the aligned apertures 21 and bore 20 and a resilient clip 25 engages the pin 22 in the diametric hole 24 to secure the leg 16 to the pad 15. A washer 26 of spring steel which is warped or curved in planar section may be interposed on the pin 22 between the leg 16 and the clip 25 to limit axial movement of the pin 22 while securing the leg 16 to the pad 15. Other types of suitable detachable securing means or connectors will be apparent to those skilled in the art.

With the support pads 15 mounted to the bed 12 of the truck 13, the high load bearing qualities of the bed 12 can be taken advantage of to enhance the amount of load which the rack 11 may carry. The sides 27 of conventional pick-up trucks are generally fabricated from light gauge sheet metal and therefore are unsuitable to support large vertical loads, without distributing the load along the sides 27. Even the stake holes 28, usually provided in the sides 27, are not suitable for large vertical loads, but are usually intended to be used for containing and resisting moderate horizontal loads applied against and above the sides 27. According to the invention, the heavy construction of the bed 12 of the truck 13 can be taken advantage of by applying the loads on the rack 11 to relatively small support pads 15 on the bed 12, without necessitating any special load distribution thereon. As an example, racks 11 built according to the invention have supported in excess of 1000 pounds even though the weight of the rack 11 is less than 75 pounds.

It will also be apparent that the rack 11 is not limited to use in pick-up trucks since the rack is mounted to the bed 12. Thus, the rack may also be used with flat-bed trucks and the like.

Returning now to FIG. 1, the rack 11 will be studied in more detail. Side rails 29 in a generally parallel and spaced apart relationship and a plurality of crossbars 30, generally perpendicular to the rails 29 and attached thereto at the ends of the rails 29 and at the legs 16, form the basic horizontal framework of the rack 11 which is elevated above and overlies the bed 12 and the cab 14 of the truck 13. The legs 16 support the horizontal framework of the rack 11 in an elevated and overlying relationship with respect to the bed 12 and the cab 14, the legs are attached to the side rails 29 and the crossbars 30 in a manner which is hereinafter described.

For further structural reinforcement and for transversely confining material on the rack 11, a pair of top rails 32 overlie the side rails 29. Ends of the top rails 32 are bent downward to attach to the ends of the side rails 29; the top rails 32 and the side rails 29 thereby forming a parallelogram when viewed from the side. Considerations of weight and cost efficiency for the rack 11 make bar stock preferable for the top rails 32, instead of tubular stock as used for the side rails 29. Support member 33 disposed between the top rails 32 and the side rails 29 at various spaced points intermediate the ends of the rails 29 and 32 provide additional structural rigidity to the rack 11.

Figure 4:
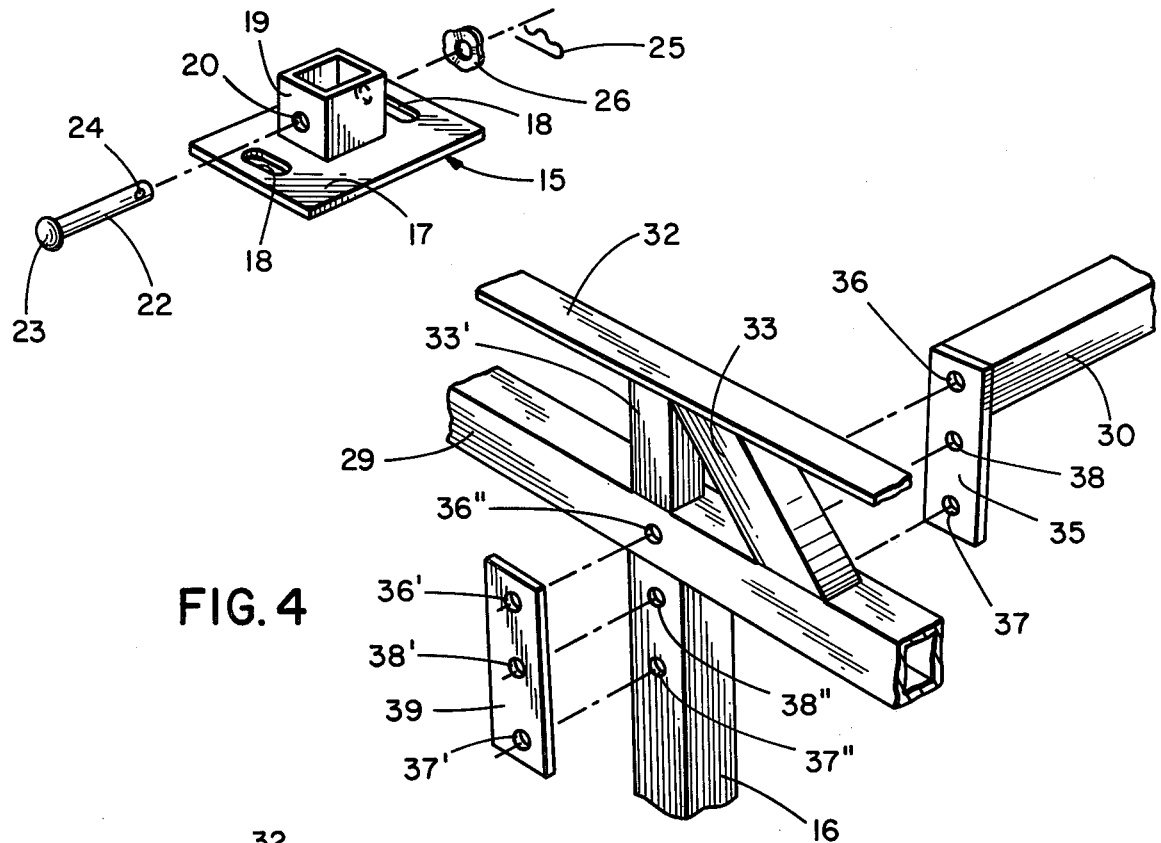
FIG. 4 is a fragmentary exploded perspective view showing the pivotable connection of the legs to the framework of the rack.

According to the invention, the bracket means which pivotally connect the legs 16 to the side rails 29 and the crossbars 30, are illustrated in FIG. 4. At each end of the crossbars 30 a tie bar 35 is rigidly affixed, as by welding or the like. The plane of the bars 35 is perpendicular to the longitudinal axis of the crossbar 30. The bar 35 has first, second and third apertures 36, 37 and 38 therethrough with the third aperture 38 located intermediate the first and second apertures 36, 37.

A tie bracket 39, similar to the tie bar 35, has apertures 36', 37' and 38' corresponding to and aligning with the apertures 36, 37 and 38 of the tie bar 35. The aperture 36 is preferably threaded for receipt of a threaded fastener, such as a bolt, through the aperture 36' of the bracket 39 and an aperture 36" through the side rail 29. The leg is then attached to the side rail 29 of the rack by fastening means through the pairs of aligned apertures 38', 38", 38 and 37', 37", and 37. Preferably the fastening means is of the quick connect-disconnect type, as employed in securing the leg 16 to pad 15 (FIG. 2) as previously described.

In accordance with the invention, the legs 16 may be pivoted by removing the fastening means in the aligned aperture 38', 38", 38 about the fastening means in aperture 37', 37", 37 which remains intact. When the legs 16 are folded against the framework of the rack 11, as shown in FIG. 3, the rack 11 has a height dimension which is considerably less than the length or width thereof. The folded rack 11 is essentially planar and is ready for efficient and convenient storage.

In practice, it has been found that normal machining tolerances in the various apertures and in the fastening means cooperating therewith provide sufficient spacing between the underside of the rail 29 and the top of the leg 16 for the pivoting action. If tighter tolerances are employed, arcing of the upper ends of the legs 16 or arcing into the side rails 29 at a point just below the aperture 36" may be required to provide sufficient clearance to permit pivoting the legs 16 about the fastening means in aperture 37', 37", 37.

Figure 5:
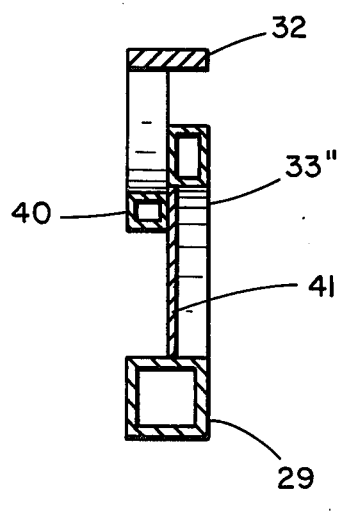
FIG. 5 is a fragmentary sectional view at sectional line 5—5 in FIG. 3 illustrating the reinforced structure in the portion of the rack which overlies the cab of the truck.

FIG. 5 illustrates a cross-sectional view of the reinforcement of that portion of the rack 11 which overlies the cab 14 of the truck 13. A diagonal brace 40 runs from the forward ends of the side rails 29 to the top rails 32 and terminates at the top rails 32 near the front side of the vertical support member 33'. Vertical support member 33' is preferably located over the aperture 36" for maximum support of the load. A plate 41 in the shape of a parallelogram is welded into the space defined by the forward portion of the top rail 32, the forward portion of the side rail 29 and the first support member 33". For a balanced appearance and additional reinforcement, plates 42 are similarly welded into the spaces defined at the rear end of the rack between the side rails 29, the top rail 32, and the support members 33.

Further reinforcement and rigidity of the rack 11 are gained through bracing means 43 which interconnect the legs 16 to the side rails 29 and to the crossbars 30 in a diagonal manner (FIG. 1). It will be readily appreciated that at least one end of the bracing means 43 must be disconnected before the legs 16 can be pivoted to the folded position, as in FIG. 3. To facilitate rapid and efficient folding of the legs 16, quick connect-disconnect type connectors are preferred, such as the pin 22 and resilient clip 25 used to connect the legs 16 to the support pads 15.

Figure 6:
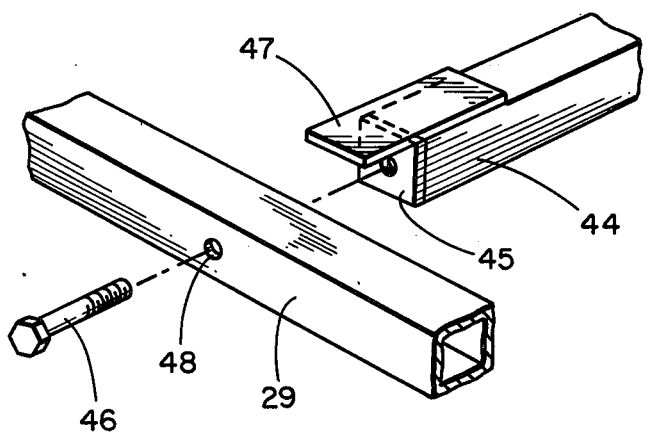
FIG. 6 is an exploded perspective view of the intermediate crossbar and the attachment thereof to the siderails of the rack.

An optional crossbar 44 may be used intermediate those crossbars 30 which are connected to the legs 16 to provide support for loads above the central area of the bed 12 of the truck 13. Additional support is frequently desired for loads which tend to sag, such as thin sheets of building material and the like or for smaller loads which are not of sufficient size to span the distance between the crossbars 30. As can be seen in FIG. 6, the optional crossbar 44 is preferably fitted with a threaded end piece 45, for cooperation with a threaded fastener 46, such as a bolt or the like, through an aperture 48 in the side rails 29. To prevent twisting of the optional crossbar 44 and subsequent loosening of the threaded fastener 46, a tab 47 is welded to the top face of the crossbar 44 at the ends thereof such that the tab 47 extends beyond the ends of the crossbar 44. When the crossbar 44 is attached to the side rails 29, the tab 47 rests against the top surface of the side rails 29 to prevent twisting of the crossbar 44. Thus the optional crossbar 44 is readily detachable for an unobstructed area above the center of the bed 12, which permits bulky loads on the bed 12 to extend above the rack 11 and also avoids head or other bodily injury to persons who may otherwise forget the presence of the crossbar 44, as during loading and the like.

It will be understood that various changes and modifications may be made without departing from the spirit of the invention as defined in the following claims, and equivalents thereof.

I claim:

1. A detachable and foldable rack to facilitate carrying material above a bed and a cab of a truck comprising:
   a plurality of legs;
   a support pad for each leg, said pad adapted to be permanently and rigidly attached to the bed of the truck;
   detachable securing means to detachably secure said legs to said support pads;
   a rectangular frame including longitudinally extending side rails and transversely extending crossbars including a rear section overlying the bed of said truck and a front section overlying the cab of said truck;
   a pair of top rails overlying said side rails and said frame;
   support members disposed between said side rails and said top rails;
   bracing means diagonally extending between each leg and said frame, said bracing means being detachably secured at an end thereof;
   bracket means pivotably connecting said legs to said frame allowing said legs to be folded against said frame whenever the legs are detached from said support pads, and at least an end of said bracing means is also detached.

2. The rack of claim 1 wherein said plurality of legs consists of a front pair and a rear pair and an additional crossbar is connected to said side rails at points intermediate said front pair and said rear pair for supporting flexible material and the like, said additional crossbar being detachably connected for an unimpeded area over the bed of said truck wherever said additional crossbar is removed.

3. The rack of claim 2 wherein said additional crossbar is of rectangular cross-sectional shape defining four sides thereof, and a tab is rigidly attached to one side of said additional crossbar at each end thereof to extend beyond the ends of said crossbar to cooperate with said longitudinally extending side rails of said frame to prevent said crossbar from turning or twisting with respect to said frame.

4. The rack of claim 1 wherein each of said support pads consists of a base plate with apertures therethrough for attachment of said base plate to the bed of said truck; a post member extending upwardly from said base plate and rigidly attached thereto; and said post member adapted to engage a leg of said rack.

5. The rack of claim 1 wherein said detachable securing means comprises a pin with a head at an end thereof and a diametric aperture near another end; and a resilient clip for cooperation with said diametric aperture.

6. The rack of claim 1 wherein each of said bracket means comprises a bar with a plurality of apertures therethrough rigidly attached at a right angle to each end of said transversely extending crossbars and a tie bracket with a plurality of apertures therethrough, said apertures in said tie bracket in aligning relationship with said apertures in said bar; and fastening means connecting said legs to said longitudinally extending side rails, between said tie bracket and said bar, through said apertures.

7. The rack of claim 6 wherein a first pair of aligning apertures between said tie bracket and said bar connect to said side rails; a second pair of aligning apertures connect said bracket and bar to said legs; and a third pair of aligning apertures, intermediate said first pair and second pair, also connect said bracket and bar to said leg; said leg being pivotable about said second pair of aligning apertures whenever the fastening means in said third pair of aligning apertures is removed and at least one end of said bracing means is detached.

* * * * *